United States Patent [19]

Miyagi et al.

[11] Patent Number: 4,799,947

[45] Date of Patent: Jan. 24, 1989

[54] APPARATUS FOR CARRYING BOTTLES IN BOTTLE MAKING MACHINE

[75] Inventors: Hiroshi Miyagi; Akihiko Ohno, both of Ogaki, Japan

[73] Assignee: Nihon Taisanbin Kogyo Kabushiki Kaisha, Gifu, Japan

[21] Appl. No.: 113,700

[22] Filed: Oct. 28, 1987

[30] Foreign Application Priority Data

Nov. 29, 1986 [JP] Japan .................. 61-285433

[51] Int. Cl.⁴ ............................... C03B 9/40
[52] U.S. Cl. ........................ 65/158; 55/159; 55/163; 55/160
[58] Field of Search ............ 65/160, 159, 165, 168, 65/163, 158

[56] References Cited

U.S. PATENT DOCUMENTS

| | | | |
|---|---|---|---|
| 3,767,374 | 10/1973 | Iacovazzi et al. | 65/165 |
| 4,409,013 | 10/1983 | Cardenas et al. | 65/160 |
| 4,494,656 | 1/1985 | Shay et al. | 65/168 |
| 4,548,637 | 10/1985 | Miller | 65/160 |

*Primary Examiner*—Arthur Kellogg
*Attorney, Agent, or Firm*—Armstrong, Nikaido, Marmelstein & Kubovcik

[57] ABSTRACT

An apparatus for carrying bottles, having a pusher for moving the bottles and a servomotor for reciprocally rotating the pusher within a predetermined angular displacement, comprising means for emitting start and stop signals of the servomotor, servo-control means for supplying a drive current to the servomotor so as to control the angular velocity of the servomotor, and for stopping the supply of the drive current to the servomotor when the servomotor is subject to an excess load above a predetermined value. The servomotor is an AC servomotor driven by the servo-control means.

4 Claims, 3 Drawing Sheets

APPARATUS FOR CARRYING BOTTLES IN BOTTLE MAKING MACHINE

BACKGROUND OF THE INVENTION

1. Field of the Invention

The present invention relates to an apparatus for carrying bottles in a bottle making machine, and more precisely it relates to an improved pusher which is usually called 90° pusher for conveying bottles onto a conveyer perpendicular to the direction of the movement of the bottles.

2. Description of the Related Art

In a bottle making machine, molded bottles (bottle bodies) are moved onto a dead plate to be cooled by the air and are then conveyed to a subsequent station. To carry the bottles to the subsequent station, the bottles are brought onto a conveyor which is located on one side of the dead plate by a pusher. The pusher rotates by about 90° to move the bottles onto the conveyer and, accordingly, is called a 90° pusher, in the field of the invention.

The reciprocal angular movement (swing movement) of the pusher does not take place at a constant angular velocity. Namely, for example, at the beginning of the swing movement of the pusher, the speed of the movement is relatively low, so that the bottle bodies are prevented from falling down when the pusher comes into contact with the bottle bodies. During the conveyance of the bottle bodies, the speed of the swing movement of the pusher is accelerated to increase the conveyance efficiency of the bottle bodies.

At this end, a rotational drive shaft of the pusher which rotates at a constant speed is provided with a cam which has a predetermined profile so as to vary the angular speed of the drive shaft.

However, in this type of speed control apparatus with the cam attached to the drive shaft of the pusher, it is necessary to exchange the cam, in accordance with shapes of the bottle bodies or the feed speed of the conveyer etc. To prepare a large number of and different kinds of cams is troublesome and costly.

On the other hand, in a bottle making factory, a plurality of independent molding apparatuses are usually provided along multiple manufacturing lines. Generally, the cams for different manufacturing lines have different angular phases. Accordingly, in order to change the number of lines which actually operate, it is necessary to adjust the angular phases of the cams in the manufacturing lines. This is, however, a troublesome operation. In addition, the operation also needs to stop the operation of the associated manufacturing lines. Furthermore, the pusher having the cam which is mechanically driven makes it difficult to realize a completely automatic bottle making system.

The primary object of the present invention is, therefore, to provide an apparatus for carrying bottles in a bottlemaking machine, in which the speed of the angular movement of the pusher can be controlled by an electrical signal, so that the control of the angular movement of the pusher becomes easier, resulting in a realization of a completely automatic bottle making system.

To achieve the object mentioned above, according to the present invention, there is provided an apparatus for carrying bottles in a bottle making machine, having a pusher for moving the bottles and a servomotor for reciprocally swinging the pusher within a predetermined angular displacement to move the bottles along an archwise track onto a conveyer, comprising means for emitting signals for the start and stop of the servomotor at a predetermined time, servo-control means for supplying a drive current to the servomotor with a predetermined change of time, in accordance with the start and stop signals to the servomotor to control the angular velocity thereof and for stopping the supply of the drive current to the servomotor when the servomotor is subject to an excess load, so that the drive current exceeds a predetermined value, and an AC servomotor which is driven by the drive current of the servo-control means.

With this arrangement of the invention, the start and stop of the operation of the servomotor and the change of the angular velocity of the pusher during operation can be automatically controlled at a predetermined cycle and at a predetermined time. If an excess torque (load) is applied to the servomotor for some reason, the drive current increases in accordance with an increase of the torque (load). When the drive current exceeds a predetermined value, the supply of the drive current is stopped to prevent the servomotor from being damaged.

BRIEF DESCRIPTION OF THE DRAWINGS

The invention will be described below in detail with reference to the accompanying drawings, in which;

In FIGS. 1 and 2, the apparatus of the invention is generally designated at 10. The apparatus 10 has a control unit 20 which has a timing signal emitter 21 for emitting signals for the start and stop of a servomotor 41 and a servo-controller 25 which controls the operation of the servomotor in response to the start and stop signals of the timing signal emiter 21, and a pusher 30 which is driven by the control unit 20 and which has a rotor 40 driven by the servomotor 41 and a hydraulic cylinder device driven by the servomotor.

Figure 1:
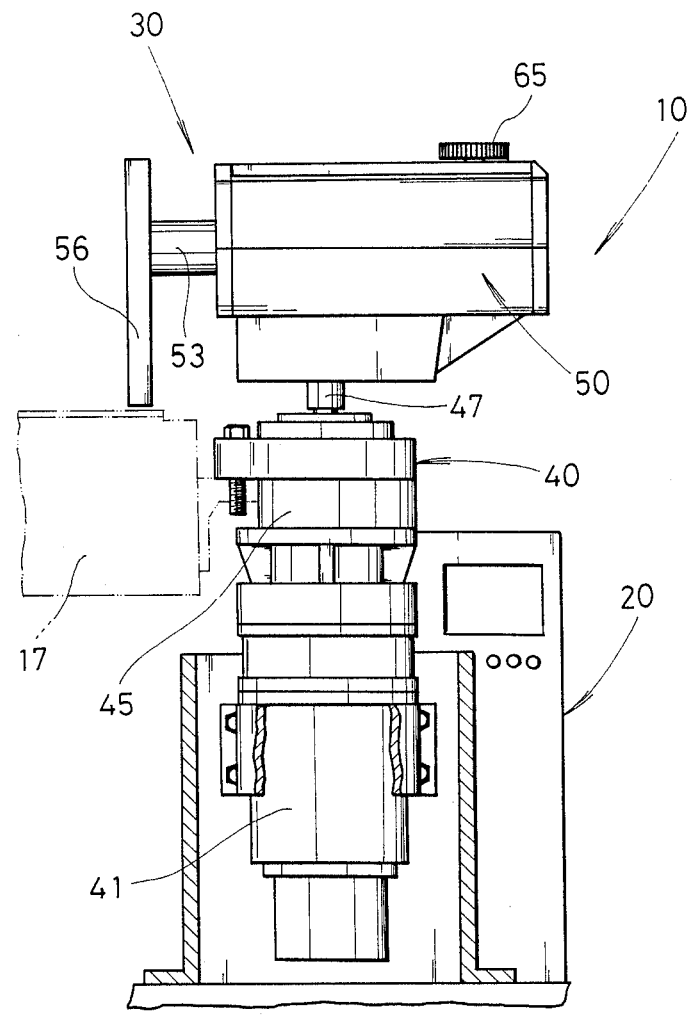
FIG. 1 is a side elevational view of an apparatus for carrying the bottles according to the present invention.

The pusher 30 carries bottles (bottle bodies) B located on a conveyer 17 onto another conveyer 18 which extends perpendicularly to the conveyer 17. The pusher 30 operates as follows.

The hydraulic cylinder device 50 which is placed in its initial position shown by an imaginary line 50' has piston rods 53 and 55 (FIG. 3) which can be hydraulically actuated to project and retract from the cylinder body of the cylinder device. First, the cylinder device 50 operates to extend the piston rods 53 and 55 outward, so that pusher arms 59 provided on the front ends of the piston rods hold the bottle bodies B at the backs of the bottle bodies.

Figure 5:
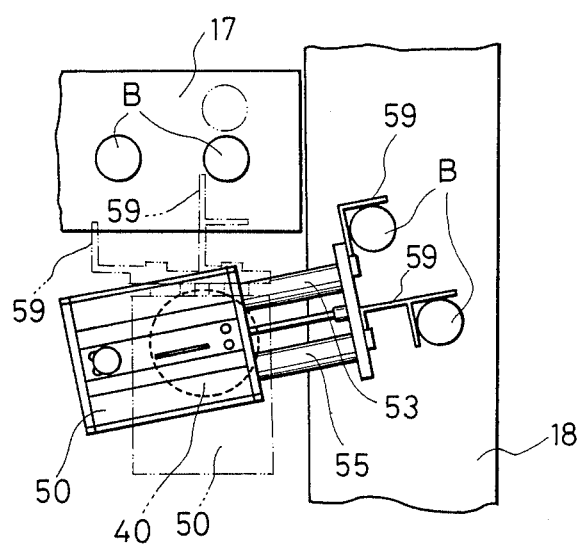
FIG. 5 is a plan view of a pusher showing the operation thereof.

After that, the cylinder device 50 is rotated to an operational position shown by a solid line in FIG. 5 by the rotor 40 to complete the feed operation of the bottles B.

The pusher 30 is controlled by the control unit 20 as follows.

Figure 2:
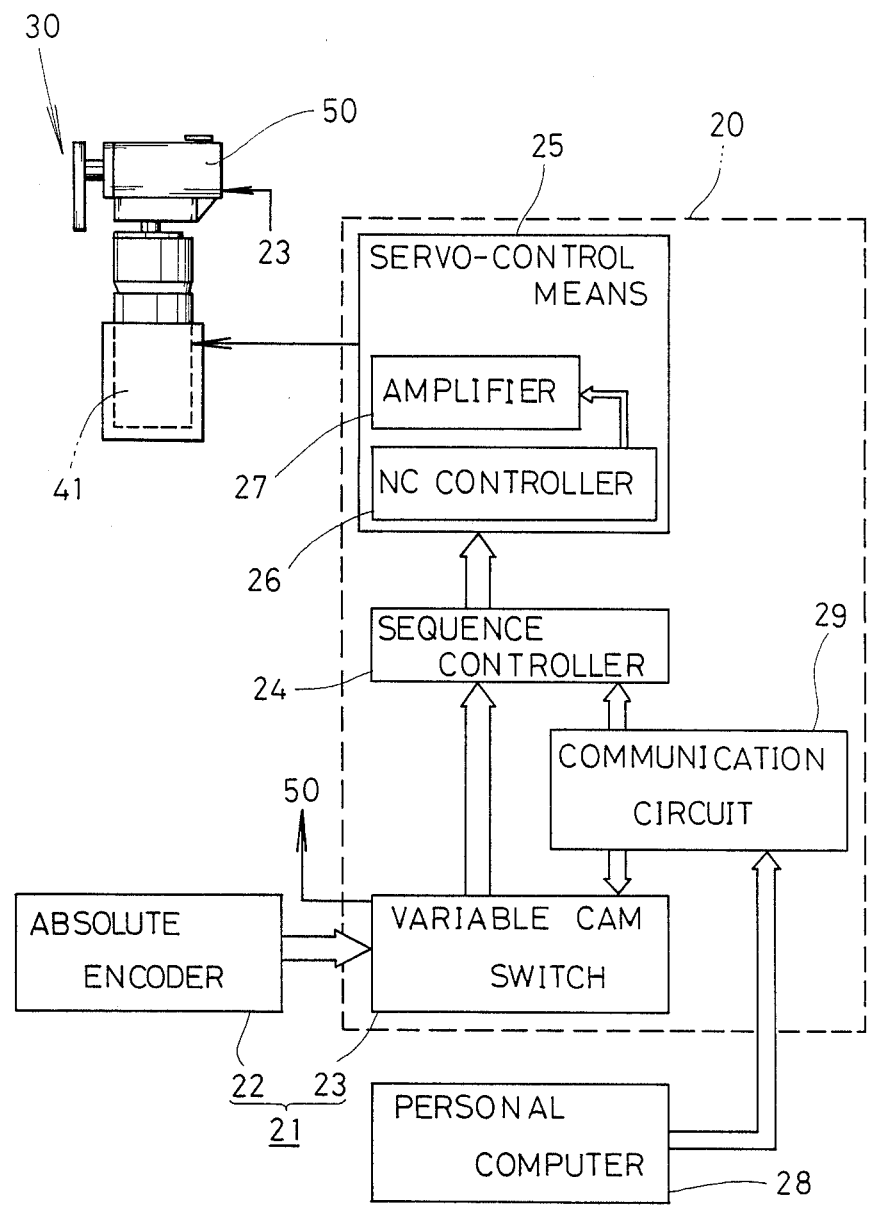
FIG. 2 is a block diagram of a control system for driving a pusher of the invention.

As can be seen from FIG. 2, the timing signal emitter 21 has an absolute encoder 22 and a variable cam switch 23. The absolute encoder 22 which is generally called a controlling synchronizer converts the rotation angle of a timing drum (not shown) which rotates at a constant cycle which is a reference of the progress of the operation, to electrical signals.

The variable cam switch 23 produces start and stop signals of the pusher at a predetermined angle (timing), in accordance with the electrical signals representing the angular displacement of the absolute encoder 22.

The rotor 40 of the pusher 30 and the cylinder device 50 operate in accordance with the signals of the timing signal emitter 21. Alternatively, it is also possible to use ETS (Electric Timing System) which emits electrical signals of angles, start and stop signals, for the timing signal emitter 21.

The servo-controller 25 has a NC controller 26 in which a cam profile corresponding to a profile of the cam of the prior art mentioned above is stored to control and vary the angular velocity of the cylinder device 50, and an amplifier 27 which amplifies electrical signals of the cam profile of the NC controller 26 to supply the drive current to the servomotor 41.

It is possible to set an optional desired cam profile in the NC controller 26 in which the numerical control is performed. An upper limit of the drive current is preset in the amplifier 27, to prevent a current above the predetermined upper limit from being supplied to the servomotor. The numeral 24 designates a sequence controller for controlling the whole control unit, and the numeral 28 designates an interface, such as a personal computer connected to a communication circuit 29.

The rotor 40 which rotates the cylinder device 50, and accordingly the pusher 30 operates as follows.

As shown in FIGS. 1 and 2, the rotor 40 has the AC servomotor 41 as a driving element, and a reduction gear 45 which reduces the rotational speed of the servomotor 41 to rotate a drive shaft 47 connected to the cylinder device 50, so that the cylinder device 50 is reciprocally rotated within a predetermined angular range.

The AC servomotor needs no exchange of a brush, resulting in an easy maintenance thereof, and accordingly is inexpensive, as is well known.

When the timing signal emitter 21 of the control unit 20 emits the start signal, the NC controller 26 of the servo-controller 25 issues pulses, in accordance with the predetermined cam profile. The pulses are amplified by the amplifier 27 and are supplied to the servomotor to drive the same. As a result, the servomotor 41 rotates with a predetermined change of angular velocity to rotate the cylinder device through the reduction gear 45. The position at which the angular movement of the cylinder device stops is determined by the number of the pulses supplied to the amplifier.

The following discussion wil be directed to the cylinder device 50.

Figure 3:
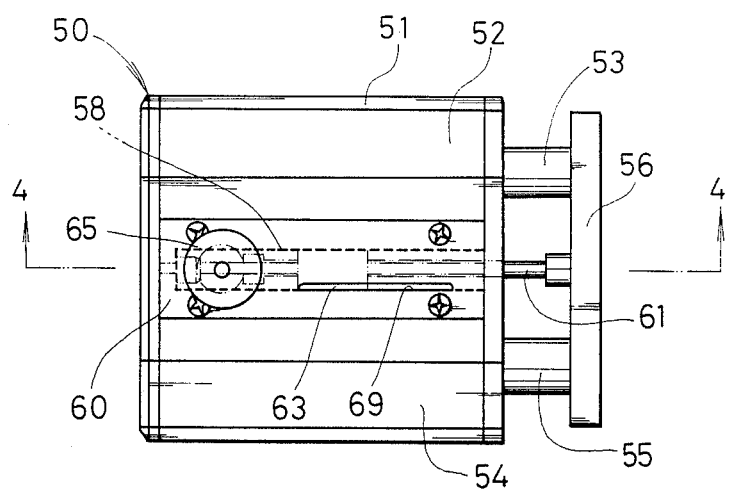
FIG. 3 is a plan view of a hydraulic cylinder device shown in FIG. 1.

As can be understood from FIG. 3, the cylinder device 50 has pneumatic cylinders 52 and 54 incorporated in a casing 51 of the device. The pneumatic cylinders 52 and 54 has the piston rods 53 and 55 which are provided, on their front ends, with a mounting plate 56 to which the pusher arms 59 are integrally connected, as mentioned before.

The cylinder device 50 also has a stop mechanism 60 which restricts a forward position of the pusher arms 59, i.e. the extended position of the piston rods 53 and 55.

Figure 4:
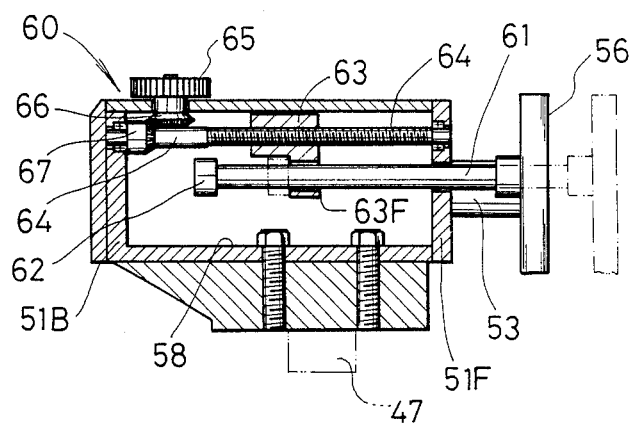
FIG. 4 is a sectional view taken along the line 4—4 in FIG. 3.

As can be seen in FIGS. 3 and 4, the stop mechanism 60 is located in a space 58 between the pneumatic cylinders 52 and 54 in the body casing 51. The stop mechanism 60 has a guide rod 61 which has at its rear end an enlarged abutment 62 and which extends in parallel with the piston rods 53 and 55. The guide rod 61 is rigidly connected to the mounting plate 56, so that the displacement of the piston rods in the axial directions thereof causes the abutment 62 to move together therewith.

When the abutment 62 moves forward, it comes into contact with an engaging portion 63F which has a through hole in which the guide rod 61 extends and which is integral with a steop 63 to stop the forward movement of the guide rod 61, and, accordingly, the piston rods 53 and 55.

The stop 63 is screw-engaged by an adjusting screw 64 which is rotatably supported by and between a front plate 51F and a back plate 51B of the body casing 51. The adjusting screw 64 has a bevel gear 67 which is engaged by a bevel gear 66 provided on an adjusting handle 65 which is rotatably held by the casing 51, so that the adjusting screw 64 can be actuated by the handle 65 to adjust the axial position of the stop 63 associated therewith. The axial position of the stop 63 can be seen through a window opening 69 formed in the casing 51.

As can be understood from the foregoing, according to the present invention, the reciprocal swing movement of the pusher is effected by the servomotor and the change of the rotational speed of the servomotor during operation and the start and stop of the servomotor can be automatically effected at a predetermined cycle and timing, and accordingly it is possible to vary the speed of rotation of the pusher during operation. This results in no provision of a plurality of cams having different cam profiles, needed in the prior art. Furthermore, accordingly to the present invention, the bottle bodies are prevented from falling down during feed thereof and an increased efficiency of the feed of the bottle bodies can be expected.

According to the present invention, since the operational conditions can be easily modified by electrical signals, no exchange of the cam as in the prior art is needed. Even in case of a plurality of bottle feed lines, each having the pusher of the invention, the operational conditions can be quickly and easily modified without stopping the operation of the feed lines.

In addition to the foregoing, if an excess torque (load) is applied to the servomotor for some reason, the servomotor can be automatically stopped to prevent it from being broken.

Since the servomotor is an AC servomotor, an easy maintenance of the device can be expected.

Finally, the pusher of the present invention makes it possible to realize a completely automatic bottle manufacturing system.

We claim:

1. An apparatus for conveying bottles in a bottle making machine having a pusher for moving said bottles and a servomotor for reciprocally swinging said pusher within a predetermined angular displacement for moving said bottles along an archwise track onto a conveyor, comprising means for emitting signals for the start and stop of said servomotor at a predetermined time, servo-control means for supplying a drive current to said servomotor with a predetermined change of time in accordance with said start and stop signals for controlling the angular speed of said servo and for stopping the supply of said drive current to said servomotor when said servomotor is subject to an excess load and said drive current exceeds a predetermined value, said servomotor being an AC servomotor driven by said drive current of said servo-control means.

2. An apparatus according to claim 1, further comprising means driven by said servomotor for rotating said pusher.

3. An apparatus according to claim 1, further comprising hydraulic means for actuating said pusher between an initial position and an operational position.

4. An apparatus for conveying bottles in a bottle making machine having a pusher for moving said bottles and a servomotor for reciprocally swinging said pusher within a predetermined angular displacement for moving said bottles along an archwise track onto a conveyor, comprising means for emitting signals for the start and stop of said servomotor at a predetermined time, servo-control means for supplying a drive current to said servomotor with a predetermined change of time in accordance with said start and stop signals for controlling the angular speed of said servomotor and for stopping the supply of said drive current to said servomotor when said servomotor is subject to excess load and said drive current exceeds a predetermined value, said servomotor being an AC servomotor driven by said drive current of said servo-control means and manually adjustable means connected to said adjustable stop means for adjusting and setting said adjustable stop means at selected set positions for restricting said movement of said pusher.

* * * * *